G. L. GABLER.
FISHING TACKLE.
APPLICATION FILED NOV. 10, 1914.
1,159,006.
Patented Nov. 2, 1915.
2 SHEETS—SHEET 1.
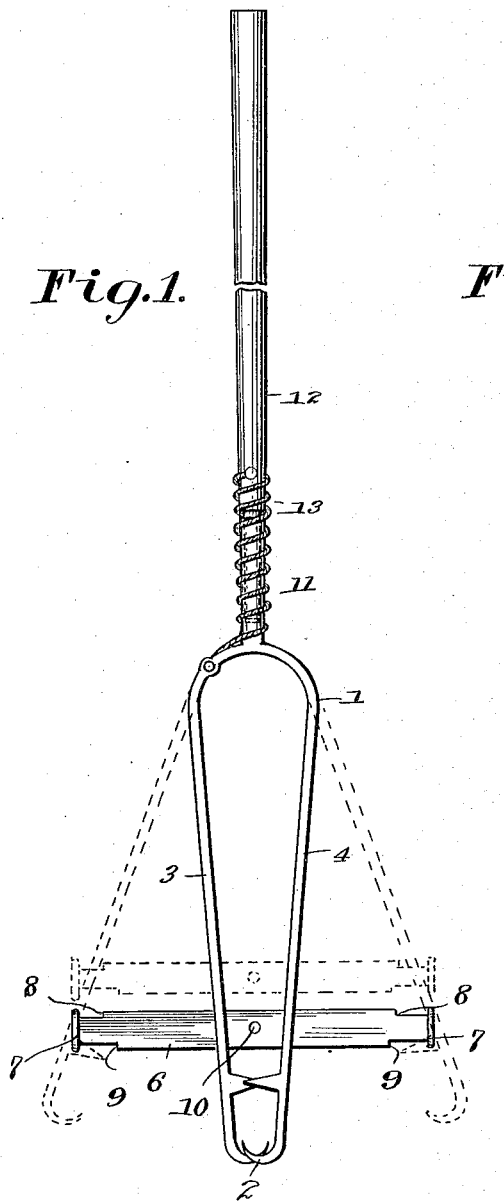
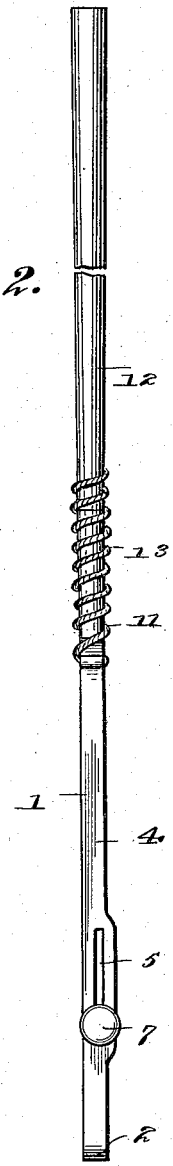
Inventor
G. L. Gabler,
Witnesses
By Victor J. Evans
Attorney

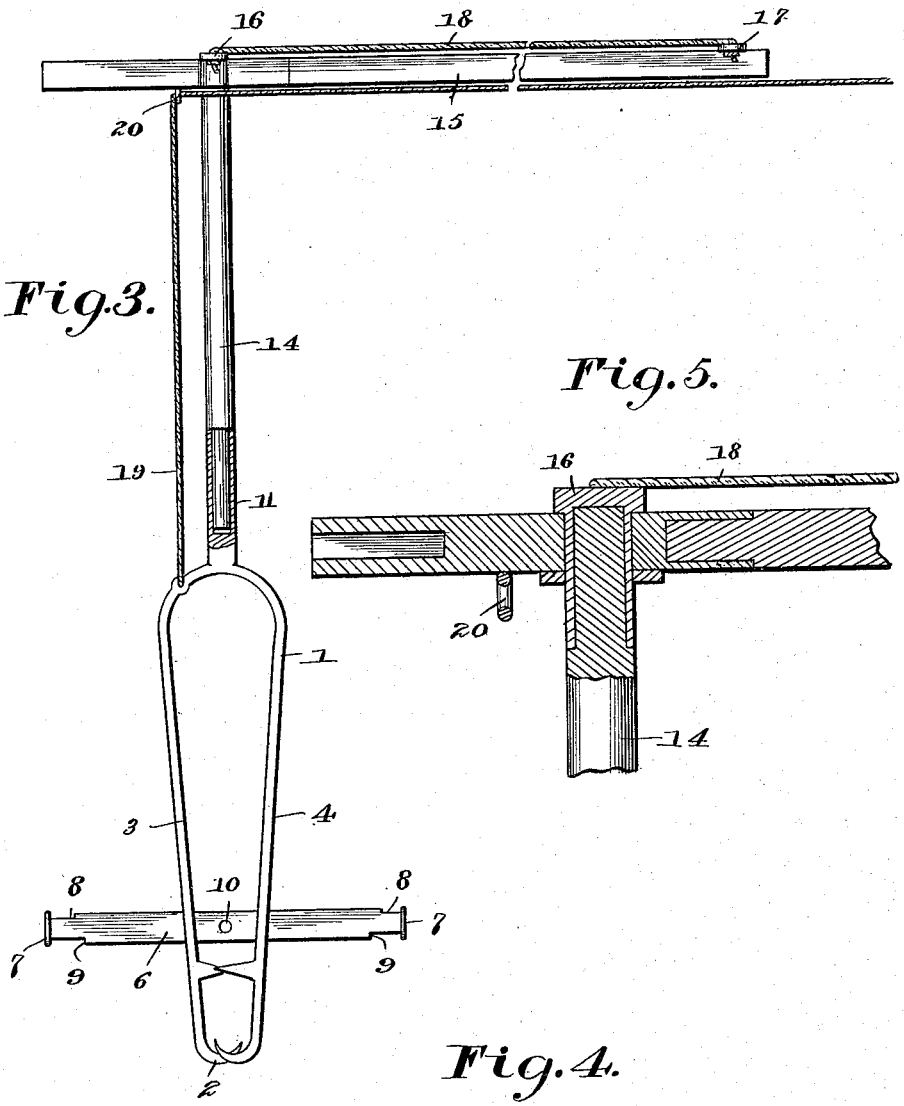

UNITED STATES PATENT OFFICE.

GEORGE LEONARD GABLER, OF DOVER COURT, ALBERTA, CANADA.

FISHING-TACKLE.

1,159,006.  Specification of Letters Patent.  Patented Nov. 2, 1915.

Application filed November 10, 1914. Serial No. 871,378.

*To all whom it may concern:*

Be it known that I, GEORGE L. GABLER, a subject of the King of Great Britain, residing at Dover Court, in the Province of Alberta, and Dominion of Canada, have invented new and useful Improvements in Fishing-Tackle, of which the following is a specification.

This invention relates to fishing implements and more particularly to combined gaffs and traps.

One of the principal objects of the invention is the provision of a simple and efficient device which may be utilized either as a spring actuated gaff or as a fish-released trap.

Another object of the invention is to so construct the device that the jaws may be readily released from the handle so that if the fish is large and struggles considerably, the operator will have a flexible connection between the handle and the jaws which will prevent the handle from being jerked out of his hands.

Further objects of the invention will appear as the following specific description is read in connection with the accompanying drawings, which form a part of this application and in which—

Figure 1 is a side elevation. Fig. 2 is an edge elevation. Fig. 3 is a side elevation showing a modified form of connecting the gaff to a rod. Fig. 4 is a top plan view thereof. Fig. 5 is an enlarged sectional view taken on the line 5—5 of Fig. 4.

Referring more particularly to the drawing 1 generally represents the gaff which is substantially U-shaped in outline and has formed upon its terminals the inturned prongs 2 which form gripping and penetrating jaws. The gaff is constructed of a single piece of metal having sufficient inherent resiliency to permit the operating of the jaws to the position shown in dotted lines in Fig. 1 and each leg indicated at 3 and 4 is supplied with a longitudinal slot 5 in which a cross-bar 6 is adapted to fit. This cross bar has its terminal ends headed up as shown at 7 so as to limit the outward movement of the legs and also prevent disengagement of the bar from the legs and adjacent each headed end the cross bar is provided with shoulders 8 and 9, the former adapted to engage the legs above the upper wall of the slots while the latter is adapted to engage the legs below the lower edge of the slots, in both instances holding the legs in spread position against the inherent resiliency thereof.

When using the device as a gigging gaff or as an ordinary fishing gaff the shoulders 9 are engaged with the legs below the lower wall of the slots 5 so that when the crossbar is pressed into engagement with the fish it will be elevated sufficiently to release the shoulders and allow the legs to spring together, the prongs 2 penetrating the side or head of the fish. When the device is used as a trap, the shoulders are engaged with the legs above the upper wall of the slots, and the bait is hooked centrally on the crossbar, an eye 10 being provided for this purpose.

Projecting above the connecting portion of the legs is a socket member 11 adapted to receive a handle 12. This handle, as is shown in Fig. 1, is frictionally held within the socket and has secured thereto one terminal of a flexible connecting element 13, the opposite terminal of which is connected to the socket member as shown. By entering the handle within the socket member and giving the same a few turns, the flexible element is wound around the socket member and the handle will assist in holding these parts in operative relation. A slight effort upon the part of the operator will cause the disengagement of these parts or they will disengage automatically if the fish struggles sufficiently. This arrangement permits handling of much larger and more vigorous fish owing to the fact that when the jaws are disconnected from the handle their otherwise rigid movement is eliminated and the tendency for the handle to be jerked out of the hands of the operator considerably lessened.

In the structure shown in Figs. 3 and 4, the handle 14 is connected to the gaff in the manner shown in Figs. 1 and 2 and has its upper end journaled in a rod 15. The upper end of the handle is provided with a cross bar 16 and a similar cross bar 17, pivoted adjacent the rear of the rod, is connected to the first cross bar by parallel cables 18 so that through the medium of these cross bars the gaff may be turned in different directions. The gaff proper, in this instance, is held upon the handle by a line 19 connected to the upper portion of the gaff and passing through an eye 20 and having its opposite end connected to a reel or other similar device, not shown. It will, of course, be understood that the reel may be released when the fish becomes caught by the gaff and that he may be played in the usual manner adopted with ordinary fishing tackle.

When the device is used as a trap, the gaff may be connected directly to a line or cable attached to any suitable stationary object on shore.

What is claimed is:—

1. In a device of the class described, a pole, a rod journaled at one end of the pole at right angles thereto, a gaff removably connected to the end of the rod, means for turning the rod, and flexible means holding the gaff upon the rod.

2. In a device of the class described, a pole, a gaff, a handle connected with the gaff and having one end journaled in the pole at right angles thereto adjacent one end of the pole, a cross bar fixed to the journaled end of the handle, a second cross bar pivoted to the pole distant from the cross bar on the journaled end of the handle, and flexible members connecting the ends of the cross bar whereby the gaff may be oscillated.

In testimony whereof I affix my signature in presence of two witnesses.

GEORGE LEONARD GABLER.

Witnesses:
W. R. MELTON,
AGNES M. SKINNER.

Copies of this patent may be obtained for five cents each, by addressing the "Commissioner of Patents, Washington, D. C."